US012101721B2

(12) United States Patent
Xing

(10) Patent No.: US 12,101,721 B2
(45) Date of Patent: Sep. 24, 2024

(54) POWER CONTROL METHOD AND APPARATUS, COMPUTER DEVICE, AND STORAGE MEDIUM

(71) Applicant: GUANGDONG OPPO MOBILE TELECOMMUNICATIONS CORP., LTD., Guangdong (CN)

(72) Inventor: Jinqiang Xing, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 380 days.

(21) Appl. No.: 17/564,255

(22) Filed: Dec. 29, 2021

(65) Prior Publication Data

US 2022/0124629 A1    Apr. 21, 2022

Related U.S. Application Data

(63) Continuation of application No. PCT/CN2019/099004, filed on Aug. 2, 2019.

(51) Int. Cl.
 *H04W 52/10* (2009.01)
 *H04W 52/14* (2009.01)
 (Continued)

(52) U.S. Cl.
 CPC ......... *H04W 52/146* (2013.01); *H04W 52/10* (2013.01)

(58) Field of Classification Search
 None
 See application file for complete search history.

(56) References Cited

U.S. PATENT DOCUMENTS 11,330,426 B2* 5/2022 Tang ............... H04W 88/08
11,368,984 B2* 6/2022 Chen ............... H04W 24/10
(Continued)

FOREIGN PATENT DOCUMENTS

CN    109392181    2/2019
CN    109802817    5/2019
(Continued)

OTHER PUBLICATIONS

Vivo, "Issues on UL transmission for LTE-NR co-existence", 3GPP TSG RAN WG1 NR Ad-Hoc#2 R1-1710385, Jun. 2017, pp. 1-5.
(Continued)

*Primary Examiner* — Pablo N Tran
(74) *Attorney, Agent, or Firm* — JCIP GLOBAL INC.

(57) ABSTRACT

A power control method and apparatus, a computer device, and a storage medium are provided. A UE receives SUL carrier information sent by an NR normal base station. Power control information is obtained according to the SUL carrier information. An uplink transmission power of the UE is adjusted according to the power control information. The SUL carrier information is used to indicate that an SUL band and an NR normal band are deployed in different station sites and whether there is a target band deployed in a co-station with the SUL band. A spectrum interval between the target band and the SUL band is less than or equal to a preset threshold value. When the SUL band and the NR normal band are deployed in different station sites, the UE may determine the power control information through the SUL carrier information, thereby adjusting an uplink power control of the UE.

20 Claims, 5 Drawing Sheets

(51) Int. Cl.
  *H04W 72/04* (2023.01)
  *H04W 72/08* (2009.01)

(56) References Cited

U.S. PATENT DOCUMENTS

| | | | | |
|---|---|---|---|---|
| 11,425,758 B2* | 8/2022 | Xie | .................... | H04W 74/0833 |
| 11,838,976 B2* | 12/2023 | Kim | .................... | H04W 74/0833 |
| 11,956,776 B2* | 4/2024 | Liu | ........................ | H04W 72/23 |
| 2020/0281023 A1* | 9/2020 | Yan | .................... | H04W 72/0453 |
| 2021/0243677 A1* | 8/2021 | Li | ............................ | H04L 5/001 |
| 2022/0094495 A1* | 3/2022 | Wang | .................... | H04W 52/02 |
| 2023/0328636 A1* | 10/2023 | Fu | ......................... | H04W 48/20 |
| 2023/0354433 A1* | 11/2023 | Xue | .................. | H04W 74/0833 |
| 2024/0064584 A1* | 2/2024 | You | .................... | H04W 36/0072 |

FOREIGN PATENT DOCUMENTS

| | | |
|---|---|---|
| CN | 110049557 | 7/2019 |
| WO | 2019032033 | 2/2019 |
| WO | WO-2024067707 A1 * | 4/2024 |

OTHER PUBLICATIONS

"International Search Report (Form PCT/ISA/210) of PCT/CN2019/099004," mailed on Apr. 22, 2020, with English translation thereof, pp. 1-4.

"Written Opinion of the International Searching Authority (Form PCT/ISA/237) of PCT/ CN2019/099004," mailed on Apr. 22, 2020, with English translation thereof, pp. 1-7.

* cited by examiner

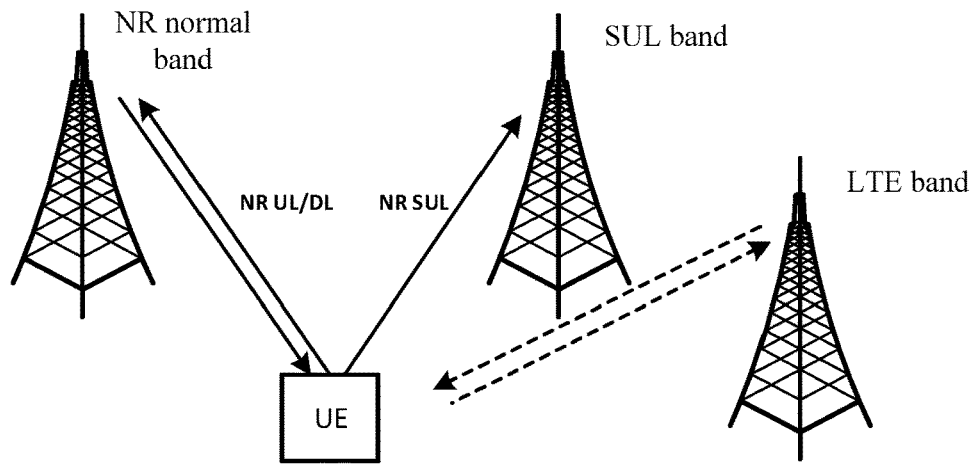

FIG. 3b

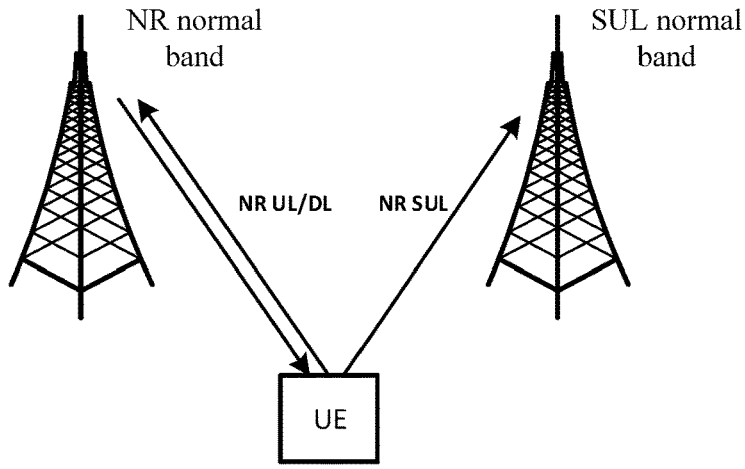

FIG. 3c

A UE receives SUL carrier information sent by an NR normal base station. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value — S101

The UE obtains power control information according to the SUL carrier information. The power control information is used to adjust an uplink transmission power of the UE — S102

FIG. 4

An NR normal base station sends SUL carrier information. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value. The SUL carrier information is also used to instruct a UE to obtain power control information. The power control information is used to adjust an uplink transmission power of the UE — S201

FIG. 5

A UE sends a power control request to a base station. The power control request includes an initial strength of an uplink reference signal of the UE. The base station is an SUL base station or an NR normal base station — S301

The UE receives power control information sent by the NR normal base station. The power control information is information determined according to the initial strength of the uplink reference signal — S302

FIG. 6

An NR normal base station receives a measured path loss of an SUL band sent by an SUL base station. The measured path loss of the SUL band is obtained by the SUL base station according to an initial strength of an uplink reference signal of a UE and an uplink receiving signal strength of the SUL band — S401

The NR normal base station adjusts an initial open loop target receiving power of the UE according to the measured path loss of the SUL band and a path loss of the SUL band corresponding to an initial transmission power of the UE to obtain an open loop target receiving power of the UE — S402

FIG. 7

POWER CONTROL METHOD AND APPARATUS, COMPUTER DEVICE, AND STORAGE MEDIUM

CROSS-REFERENCE TO RELATED APPLICATION

This application is a continuation of international PCT application serial no. PCT/CN2019/099004, filed on Aug. 2, 2019. The entirety of the above-mentioned patent application is hereby incorporated by reference herein and made a part of this specification.

BACKGROUND

Technical Field

The disclosure relates to the field of communications, and in particular to a power control method and apparatus, a computer device, and a storage medium.

Description of Related Art

With the development of wireless communication technology, the new radio (NR) has become the most popular research and development focus in the communication industry of today. When the new radio (NR) is deployed at a relatively high frequency (such as the 3.5 GHz band), the uplink network coverage thereof is less than the downlink network coverage, which causes the overall network coverage to be very small. To solve the issue of insufficient uplink coverage, a single uplink (SUL) band is introduced. The frequency of the band is generally relatively low. The lower the frequency, the smaller the space loss, and the greater the coverage, so that the SUL band may make up for the defect of small uplink coverage in the NR normal band.

As shown in FIG. 1, the normal band, regardless of the frequency division duplex (FDD) band or the time division duplex (TDD) band, has both uplink transmission and downlink transmission. Such band may be used independently without relying on and cooperating with other bands. The SUL band can only be used for uplink transmission, and there is no corresponding downlink transmission, so the SUL band cannot be used independently and needs to be used in conjunction with another normal band. The common SUL band needs to be used in conjunction with the NR normal band. In actual deployment, the SUL band and the NR normal band may be deployed in a co-station or in different stations. Moreover, the SUL band often has a corresponding spectrum overlapping the long term evolution (LTE) band. In an actual network, the SUL band may be in a co-station site with the LTE band or may not be in a co-station site with the LTE.

Currently, before the terminal performs uplink transmission, uplink power control needs to be performed, and a path loss between the terminal and the base station is a very critical step in the uplink power control by the terminal. As shown in FIG. 2, in the case where the SUL band and the NR normal band are deployed in a co-station, the terminal can obtain the path loss through measuring the strength of the downlink (DL) synchronization signal block (SSB) of the NR normal band and combining the original power when the base station transmits the SSB. For the SUL band, there is no corresponding downlink band, so the strength of the DL SSB of the corresponding band cannot be directly measured to obtain the path loss. However, since in the case where the SUL band and the NR normal band are deployed in a co-station site, spatial propagation paths travelled by the two are the same, the path loss may be indirectly estimated through measuring the strength of the DL SSB of the NR normal band.

However, in the case where the SUL band and the NR normal band are deployed in different station sites, the path loss of the SUL band can no longer be estimated through measuring the downlink signal of the NR normal band, so that the UE cannot perform the uplink power control.

SUMMARY

Based on the above, the disclosure provides a power control method and apparatus, a computer device, and a storage medium.

According to a first aspect, an embodiment of the disclosure provides a power control method, which includes the following.

A user equipment (UE) receives single uplink (SUL) carrier information sent by a new radio (NR) normal base station. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value.

The UE obtains power control information according to the SUL carrier information. The power control information is used to adjust an uplink transmission power of the UE.

According to a second aspect, an embodiment of the disclosure provides a power control method, which includes the following.

An NR normal base station sends SUL carrier information. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value. The SUL carrier information is also used to instruct the UE to obtain power control information. The power control information is used to adjust an uplink transmission power of the UE.

According to a third aspect, an embodiment of the disclosure provides a power control method, which includes the following.

An SUL base station receives a power control request carrying an initial strength of an uplink reference signal of a UE. The power control request is a request triggered when the UE receives SUL carrier information sent by an NR normal base station. The SUL carrier information is used to indicate that an SUL band and an NR normal band are deployed in different station sites and there is no target band deployed in a co-station with the SUL band. Standards of the target band and the SUL band are different, and a spectrum interval between the target band and the SUL band is less than or equal to a preset threshold value. The SUL carrier information is also used to instruct the UE to obtain power control information. The power control information is used to adjust an uplink transmission power of the UE.

According to a fourth aspect, an embodiment of the disclosure provides a power control apparatus, which includes the following.

A receiving module is used to receive single uplink (SUL) carrier information sent by a new radio (NR) normal base station. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value.

An obtaining module is used to obtain power control information according to the SUL carrier information. The power control information is used to adjust an uplink transmission power of the UE.

According to a fifth aspect, an embodiment of the disclosure provides a power control apparatus, which includes a processing module and a sending module.

The processing module is used to send SUL carrier information through the sending module. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value. The SUL carrier information is also used to instruct the UE to obtain power control information. The power control information is used to adjust an uplink transmission power of the UE.

According to a sixth aspect, an embodiment of the disclosure provides a power control apparatus, which includes a processing module and a receiving module.

The processing module is used to receive a power control request carrying an initial strength of an uplink reference signal of a UE through the receiving module. The power control request is a request triggered when the UE receives SUL carrier information sent by an NR normal base station. The SUL carrier information is used to indicate that an SUL band and an NR normal band are deployed in different station sites and there is no target band deployed in a co-station with the SUL band. Standards of the target band and the SUL band are different, and a spectrum interval between the target band and the SUL band is less than or equal to a preset threshold value. The SUL carrier information is also used to instruct the UE to obtain power control information. The power control information is used to adjust an uplink transmission power of the UE.

According to a seventh aspect, an embodiment of the disclosure provides a computer device, which includes a memory and a processor. The memory stores a computer program. When the processor executes the computer program, the steps of the method in the first aspect are implemented.

According to an eighth aspect, an embodiment of the disclosure provides a computer device, which includes a memory and a processor. The memory stores a computer program. When the processor executes the computer program, the steps of the method in the second aspect are implemented.

According to a ninth aspect, an embodiment of the disclosure provides a computer device, which includes a memory and a processor. The memory stores a computer program. When the processor executes the computer program, the steps of the method in the third aspect are implemented.

According to a tenth aspect, an embodiment of the disclosure provides a computer-readable storage medium stored with a computer program. When the computer program is executed by a processor, the steps of the method in the first aspect are implemented.

According to an eleventh aspect, an embodiment of the disclosure provides a computer-readable storage medium stored with a computer program. When the computer program is executed by a processor, the steps of the method in the second aspect are implemented.

According to a twelfth aspect, an embodiment of the disclosure provides a computer-readable storage medium stored with a computer program. When the computer program is executed by a processor, the steps of the method in the third aspect are implemented.

In the power control method and apparatus, the computer device, and the storage medium according to the disclosure, the UE receives the SUL carrier information sent by the NR normal base station, the power control information is obtained according to the SUL carrier information, and the uplink transmission power of the UE is adjusted according to the power control information. The SUL carrier information is used to indicate that the SUL band and the NR normal band are deployed in different station sites and whether there is the target band deployed in a co-station with the SUL band, and the spectrum interval between the target band and the SUL band is less than or equal to the preset threshold value. Therefore, when the SUL band and the NR normal band are deployed in different station sites, the UE may determine the power control information through the SUL carrier information sent by the NR normal base station, thereby adjusting the uplink power control of the UE and preventing the technical issue that when the SUL band and the NR normal band are deployed in different station sites, a path loss of the SUL band can no longer be estimated through measuring the downlink signal of the NR normal band, which causes the UE to be unable to perform the uplink power control.

BRIEF DESCRIPTION OF THE DRAWINGS

FIG. 3a to FIG. 3c are schematic diagrams of scenarios of a power control method according to an embodiment of the disclosure.

FIG. 4 is a flowchart of a power control method according to an embodiment of the disclosure.

FIG. 5 is a flowchart of another power control method according to an embodiment of the disclosure.

FIG. 6 is a flowchart of another power control method according to an embodiment of the disclosure.

FIG. 7 is a flowchart of another power control method according to an embodiment of the disclosure.

DETAILED DESCRIPTION OF DISCLOSED EMBODIMENTS

In order for the objectives, technical solutions, and advantages of the disclosure to be clearer, the disclosure is further described in detail below with reference to the accompanying drawings and embodiments. It should be understood that the specific embodiments described here are only used to explain but not to limit the disclosure.

Figure 1:
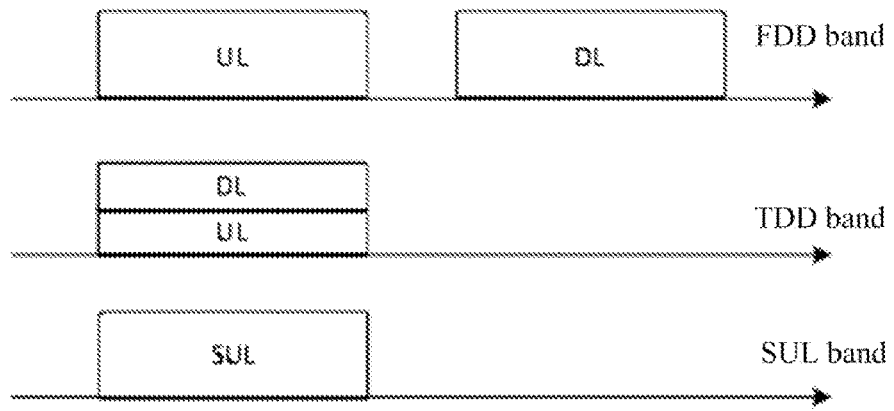
FIG. 1 is a schematic diagram of a normal band and an SUL band according to an embodiment.
Figure 2:
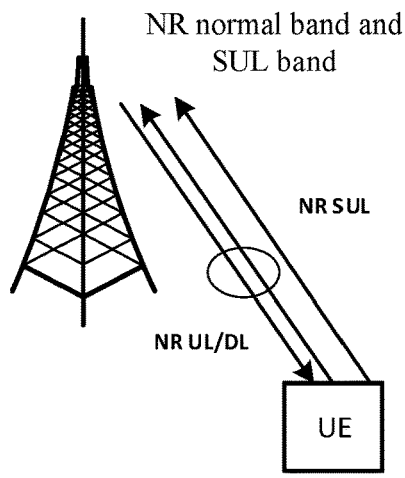
FIG. 2 is a schematic diagram of an SUL band and an NR normal band deployed in a co-station site according to an embodiment.
Figure 3A:
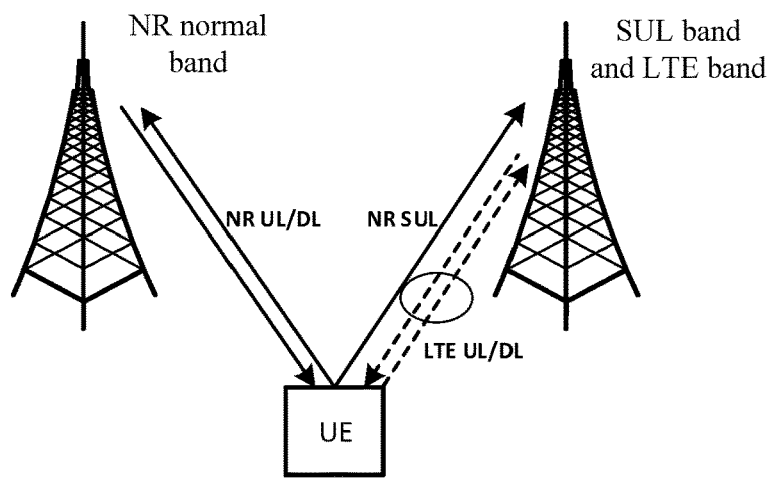

FIG. 3a to FIG. 3c are schematic diagrams of scenarios of a power control method according to an embodiment of the disclosure. As shown in FIG. 3a to FIG. 3c, the scenario includes an NR normal base stations, an SUL base station, and a user equipment (UE). Also, in the scenario, an NR normal band and an SUL band are deployed in different station sites. In some scenarios, base stations corresponding to other bands different from the standard of the SUL band, such as an LTE base station, may also be included. In FIG. 3a, there is an LTE band that overlaps with or is close to the spectrum of the SUL band, and the SUL band and the LTE band are deployed in a co-station site. In FIG. 3b, there is an LTE band that overlaps with or is close to the spectrum of the SUL band, and the SUL band and the LTE band are deployed in different station sites. In FIG. 3c, there is no LTE band that overlaps with or is close to the spectrum of the SUL band. A spectrum interval X MHz may be used as a limit. If a spectrum interval between the SUL band and the LTE band is less than X, the spectrum of the SUL band considered as being close to the spectrum of the LTE band.

In an NR system, the current NR normal base station notifies the UE in a cell that there is an SUL carrier in the cell in a broadcast message. The UE may initiate a random access on the SUL carrier, but the UE needs to be able to accurately perform power control on the SUL band. The path loss may be used as an important parameter for the power control, that is, the UE needs to accurately measure a path loss PL of the SUL band from the UE to the base station. In the prior art, there is no corresponding downlink band for the SUL band, and the strength of the DL SSB of the corresponding band cannot be directly measured to obtain a path loss. However, since in the case where the SUL band and the NR normal band are deployed in a co-station site, spatial propagation paths travelled by the two are the same, the path loss may be indirectly estimated through measuring the DL SSB of the NR normal band. Of course, there is a frequency difference between the SUL band and the NR normal band, which cannot be completely equivalent in terms of path loss, so a certain correction for the difference in the path loss is made at the base station end currently. However, in the case where the SUL band and the NR normal band are deployed in different station sites, the propagation paths travelled by the SUL band and the NR normal band are different, the path loss of the SUL band can no longer be estimated through measuring the downlink signal of the NR normal band, and the UE can no longer perform the uplink power control.

The power control method according to the embodiment of the disclosure can solve the technical issue that "when the SUL band and the NR normal band are deployed in different station sites, the path loss of the SUL band can no longer be estimated through measuring the downlink signal of the NR normal band, which causes the UE to be unable to perform the uplink power control". However, the disclosure is not limited to solving the technical issue that "when the SUL band and the NR normal band are deployed in different station sites, the path loss of the SUL band can no longer be estimated through measuring the downlink signal of the NR normal band, which causes the UE to be unable to perform the uplink power control" and may also be used to solve other technical issues, which are not limited in the disclosure.

FIG. 4 is a flowchart of a power control method according to an embodiment of the disclosure. The execution subject of the method is a UE. The method relates to the implementation process of the UE performing uplink power control when an SUL band and an NR normal band are deployed in different station sites. As shown in FIG. 4, the method may include the following steps.

In Step S101, the UE receives SUL carrier information sent by an NR normal base station. The SUL carrier information is used to indicate that the SUL band and the NR normal band are deployed in different station sites and whether there is a target band deployed in a co-station with the SUL band. Standards of the target band and the SUL band are different, and a spectrum interval between the target band and the SUL band is less than or equal to a preset threshold value.

The target band may be a band of any standard in 2G/3G/4G. For example, the target band is an LTE band. The embodiments of the disclosure are all exemplified by the target band being the LTE band, but not limited thereto. The spectrum interval between bands may be an interval between center frequency points of the bands, an interval between starting frequency points of the bands, or an interval between end frequency points of the bands, which is not limited in the embodiment. In addition, when the spectrum interval is less than or equal to the preset threshold value, the target band and the SUL band may be considered as overlapping, which may be partially overlapping or completely overlapping.

In the embodiment, before performing the power control, the UE first needs to know the current base station deployment situation. Therefore, the NR normal base station needs to send the SUL carrier information. Optionally, the NR normal base station may send the SUL carrier information by adopting various manners. For example, the NR normal base station may carry the SUL carrier information in an RRC signaling to be sent to the UE supporting the SUL carrier. For another example, if the UEs in the cell all support the SUL carrier, the NR normal base station may broadcast the SUL carrier information to the UEs in the cell. For example, the NR normal base station may periodically broadcast the SUL carrier information or may broadcast the SUL carrier information when a new UE access is detected. The SUL carrier information needs to carry the following new information: whether the SUL band and the NR normal band are deployed in a co-station site and whether there is an LTE band deployed in a co-station site with the SUL band and the spectrums overlap or are close. Since the disclosure mainly relates to the case where the SUL band and the NR normal band are deployed in different station sites, the embodiments of the disclosure are all exemplified by the SUL carrier information being used to indicate that the SUL band and the NR normal band are deployed in different station sites to elaborate on the power control method.

As shown in FIG. 3a to FIG. 3c, the SUL band and the NR normal band are all deployed at different stations. In FIG. 3a, there is a target LTE band deployed in a co-station site with the SUL band. A spectrum interval between the target LTE band and the SUL band is less than or equal to a preset threshold value. For example, when the preset threshold value is 300 MHz, if the spectrum interval between the target LTE band and the SUL band is 0, the spectrums of the LTE band and the SUL band are determined as completely overlapping; and if the spectrum interval between the target LTE band and the SUL band is greater than 0 and less than or equal to 300 MHz, the spectrums of the target LTE band and the SUL band are determined as being close, that is, the spectrums of the target band and the SUL band partially overlap. The preset threshold value may also be other threshold values, which may be set by persons skilled in the art according to actual requirements and is not limited in the disclosure.

There is no target LTE band deployed in a co-station with the SUL band in FIG. 3b and FIG. 3c. Although there is an LTE band that overlaps with or is close to the spectrum of the SUL band in FIG. 3b, the LTE band and the SUL band are deployed in different station sites. In FIG. 3c, there is neither an LTE band deployed in a co-station with the SUL band nor an LTE band that overlaps with or is close to the spectrum of the SUL band.

In Step S102, the UE obtains power control information according to the SUL carrier information. The power control information is used to adjust an uplink transmission power of the UE.

The power control information may include the path loss of the SUL band, an open loop receiving power of the UE, etc.

In the embodiment, after receiving the SUL carrier information sent by the NR normal base station, the UE may adopt various methods to obtain the power control information. For example, after receiving the SUL carrier information sent by the NR normal base station, the UE may send a request message for performing path loss auxiliary measurement to the SUL base station. After receiving the request message, the SUL base station calculates to obtain the path loss of the SUL band of the UE, and informs the NR normal base station of the path loss of the SUL band. Then, the NR normal base station informs the UE that the UE may adjust the uplink transmission power thereof according to the path loss of the SUL band. Alternatively, after the SUL base station informs the NR normal base station of the path loss of the SUL band, the NR normal base station may also adjust the open loop target receiving power of the UE according to the path loss of the SUL band, and send the new open loop target receiving power to the UE. The UE adjusts the uplink transmission power thereof according to the new open loop target receiving power. Alternatively, the UE may also send a request message for performing SUL band path auxiliary power control to the NR normal base station. The NR normal base station forwards the request message to the SUL base station. After receiving the request message, the SUL base station calculates to obtain the path loss of the SUL band of the UE, and informs the NR normal base station of the path loss of the SUL band. Then, the NR normal base station informs the UE that the UE may adjust the uplink transmission power thereof according to the path loss of the SUL band.

In the power control method according to the embodiment of the disclosure, the UE receives the SUL carrier information sent by the NR normal base station, the power control information is obtained according to the SUL carrier information, and the uplink transmission power of the UE is adjusted according to the power control information. The SUL carrier information is used to indicate that the SUL band and the NR normal band are deployed in different station sites and whether there is a target band deployed in a co-station with the SUL band, and the spectrum interval between the target band and the SUL band is less than or equal to the preset threshold value. Therefore, when the SUL band and the NR normal band are deployed in different station sites, the UE may determine the power control information through the SUL carrier information sent by the NR normal base station, thereby adjusting the uplink power control of the UE and preventing the technical issue that when the SUL band and the NR normal band are deployed in different station sites, the path loss of the SUL band can no longer be estimated through measuring the downlink signal of the NR normal band, which causes the UE to be unable to perform the uplink power control.

FIG. 5 is a flowchart of another power control method according to an embodiment of the disclosure. The execution subject of the method is an NR normal base station. As shown in FIG. 5, the method may include the following steps.

In Step S201, an NR normal base station sends SUL carrier information. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value. The SUL carrier information is also used to instruct a UE to obtain power control information. The power control information is used to adjust an uplink transmission power of the UE.

For the implementation principle and beneficial effect of the power control method according to the embodiment of the disclosure, reference may be made to the embodiment shown in FIG. 4, which will not be repeated here.

In the embodiment shown in FIG. 4 or FIG. 5 above, it can be seen that when the SUL band and the NR normal band are deployed in different station sites, there may be the LTE band deployed in a co-station site with the SUL band and the spectrums overlap or are close or there may not be the LTE band deployed in a co-station site with the SUL band and the spectrums overlap or are close. The following Embodiment 1 and Embodiment 2 respectively introduce the specific implementation processes of the power control method under the two scenarios.

Embodiment 1: There is the LTE band deployed in a co-station site with the SUL band and the spectrums overlap or are close.

In the embodiment, the SUL carrier information is used to indicate that there is the target band deployed in a co-station with the SUL band. The power control information includes the path loss of the target band obtained by the UE according to the strength of the downlink signal of the target band.

In the embodiment, in an idle state, the UE may determine a current network deployment situation after reading the SUL carrier information. If the SUL band and the LTE band are deployed in a co-station and the spectrums overlap or are close, the UE may first measure a downlink reference signal receiving power (RSRP) of the LTE base station before initiating a random access to the SUL band, and further obtain the path loss corresponding to the LTE band according to the downlink RSRP. The UE may use the path loss as the path loss of the SUL band to calculate the transmission power. After entering a connection state, the UE needs to first measure and update the path loss of the LTE band before adjusting the uplink power. Of course, in the case where the UE is moving at a low speed, the previously measured path loss of the LTE band may also be directly used for power adjustment.

In the power control method according to the embodiment of the disclosure, when the SUL band and the NR normal band are deployed in different station sites, if there is the LTE band deployed in a co-station site with the SUL band and the spectrums overlap or are close, the UE may measure the downlink RSRP of the LTE base station, and further obtain the path loss corresponding to the LTE band according to the downlink RSRP. The UE may use the path loss of the LTE band as the path loss of the SUL band to calculate the transmission power. The calculation process is simple and convenient, and the efficiency is high.

As shown in FIG. 3a, the SUL band and the NR normal band are deployed in different station sites, and the SUL band and the LTE band with overlapping spectrum or close spectrum are deployed in a co-station. In the deployment scenario, signal propagation paths on the two bands during the communication process between the UE and the base station are the same, and the path loss PL may be considered the same. Then, the UE may obtain the uplink path loss of the SUL band through measuring the downlink signal of the LTE band.

Embodiment 2: There is no LTE band deployed in a co-station site with the SUL band and the spectrums overlap or are close.

In the embodiment, the SUL carrier information is used to indicate that there is no target band deployed in a co-station with the SUL band. Optionally, there being no target band deployed in a co-station with the SUL band includes: the SUL band and the target band being deployed in different station sites or there being no target band. As shown in FIG. 3b, there is the LTE band overlapping or close to the spectrum of the SUL band, and the LTE band and the SUL band are deployed in different station sites. As shown in FIG. 3c, there is no LTE band overlapping or close to the spectrum of the SUL band.

Further, as shown in FIG. 6, in the embodiment, Step S102 where "the UE obtains the power control information according to the SUL carrier information" in FIG. 4 may include the following.

In Step S301, a UE sends a power control request to a base station. The power control request includes an initial strength of an uplink reference signal of the UE. The base station is an SUL base station or an NR normal base station.

In the embodiment, the UE may either send the power control request to the SUL base station or send the power control request to the NR normal base station. The power control request is used to request to obtain power control information. Optionally, the UE may adopt a maximum transmission power to send the power control request to the SUL base station. Optionally, the UE may also adopt a preset transmission power to send the power control request to the NR normal base station.

In the embodiment, since the UE does not know the path loss between the UE and the SUL base station, in order to ensure the signal transmission quality, the UE may adopt the maximum transmission power to send the power control request to the SUL base station. Alternatively, since the UE may know the path loss between the UE and the NR normal base station, the UE may determine the preset transmission power according to the path loss between the UE and the NR normal base station, and adopt the preset transmission power to send the power control request to the NR normal base station, which ensures the signal quality while saving energy consumption.

In Step S302, the UE receives the power control information sent by the NR normal base station. The power control information is information determined according to the initial strength of the uplink reference signal.

In the embodiment, the power control information may be the path loss of the SUL band of the UE determined by the SUL base station or the NR normal base station according to the initial strength of the uplink reference signal. Alternatively, the power control information may also be the open loop target receiving power of the UE. The SUL base station or the NR normal base station determines the path loss of the SUL band of the UE according to the initial strength of the uplink reference signal. Then, the NR normal base station adjusts an initial open loop target receiving power of the UE according to the path loss of the SUL band of the UE to obtain the open loop target receiving power of the UE.

In the power control method according to the embodiment of the disclosure, the UE sends the power control request to the base station. The UE receives the power control information sent by the NR normal base station. The uplink path loss of the SUL band of the UE is auxiliary measured through a base station and is fed back to the UE, which can be precisely control the transmission power of the UE.

Since there are various manners to obtain the power control information, the power control method according to Embodiment 2 will be described in detail below through multiple solutions.

Solution 1: The UE adjusts the transmission power of the UE according to the path loss of the SUL band.

In one of the embodiments, the power control information includes the path loss of the SUL band. The path loss of the SUL band is obtained by the SUL base station or the NR normal base station according to the initial strength of the uplink reference signal and an uplink receiving signal strength of the SUL band.

In the embodiment, the SUL base station may calculate to obtain the path loss of the SUL band according to the measured uplink receiving signal strength of the SUL band and the initial strength of the uplink reference signal of the UE carried in the power control request. Alternatively, the SUL base station may also send the measured uplink receiving signal strength of the SUL band to the NR normal base station. The NR normal base station calculates to obtain the path loss of the SUL band according to the uplink receiving signal strength of the SUL band and the initial strength of the uplink reference signal of the UE carried in the power control request.

Solution 2: The UE adjusts the transmission power of the UE according to the open loop target receiving power of the UE.

In one of the embodiments, the power control information includes the open loop target receiving power of the UE. The open loop target receiving power is obtained by the NR normal base station adjusting the initial open loop target receiving power of the UE according to a measured path loss of the SUL band and the path loss of the SUL band corresponding to an initial transmission power of the UE. The measured path loss of the SUL band is obtained by the SUL base station or the NR normal base station according to the initial strength of the uplink reference signal and the uplink receiving signal strength of the SUL band.

In the embodiment, after the SUL base station or the NR normal base station calculates to obtain the measured path loss of the SUL band according to the initial strength of the uplink reference signal and the uplink receiving signal strength of the SUL band, the NR normal base station adjusts the initial open loop target receiving power of the UE according to the measured path loss of the SUL band and the path loss of the SUL band corresponding to the initial transmission power of the UE to obtain the open loop target receiving power of the UE. For example, the NR normal base station obtains the SUL PL measured by the SUL base station and the SUL PL0 corresponding to the initial transmission power of the UE, and then adds the value of SUL PL0-SUL PL to the initial open loop target receiving power of the UE to obtain the open loop target receiving power of the UE.

The above Solution 1 and Solution 2 are exemplified by the UE side being the execution subject. The power control method according to Embodiment 2 is described below by taking the NR normal base station as an example. It should be noted that the definitions and explanations related to the power control information in the above Solution 1 and Solution 2 are all applicable to the embodiment exemplified by the NR normal base station and are also applicable to the subsequent embodiment exemplified by the SUL base station.

In the embodiment, when the SUL carrier information is used to indicate that there is no target band deployed in a co-station with the SUL band, the method shown in FIG. 5 further includes: the NR normal base station obtaining the power control information and sending the power control information to the UE. The following describes in detail how the NR normal base station obtains the power control information through multiple solutions.

Solution 3: The UE sends the power control request to the SUL base station, so that the NR normal base station uses the received path loss of the SUL band sent by the SUL base station as the power control information.

In the embodiment, the power control information includes the path loss of the SUL band. The path loss of the SUL band is obtained by the SUL base station or the NR normal base station according to the initial strength of the uplink reference signal of the UE and the uplink receiving signal strength of the SUL band.

In the embodiment, the UE sends the power control request carrying an initial strength SUL_Ref_Power of the uplink reference signal of the UE to the SUL base station. After receiving the power control request, the SUL measures a corresponding uplink signal strength SUL_Receive_Power, and the SUL base station calculates to obtain that the path loss of the SUL band of the UE is SUL PL=SUL_Ref_Power−SUL_Receive_Power. The SUL base station informs the NR normal base station of the path loss SUL PL and requests the NR normal base station to feed back the SUL PL information to the UE. The UE receives the SUL PL information sent by the NR normal base station to adjust the transmission power thereof. Alternatively, after receiving the power control request, the SUL measures the corresponding uplink signal strength SUL_Receive_Power and sends the SUL_Receive_Power to the NR normal base station, and the NR normal base station calculates to obtain that the path loss of the SUL band of the UE is SUL PL=SUL_Ref_Power−SUL_Receive_Power. The NR normal base station feeds back the SUL PL information to the UE. The UE receives the SUL PL information sent by the NR normal base station to adjust the transmission power thereof.

Solution 4: The UE sends the power control request to the SUL base station, so that the NR normal base station obtains the open loop target receiving power of the UE as the power control information.

In the embodiment, the power control information includes the open loop target receiving power of the UE. As shown in FIG. 7, the step where "the NR normal base station obtains the power control information" includes the following.

In Step S401, an NR normal base station receives a measured path loss of an SUL band sent by an SUL base station. The measured path loss of the SUL band is obtained by the SUL base station according to an initial strength of an uplink reference signal of a UE and an uplink receiving signal strength of the SUL band.

In the embodiment, the UE sends the power control request carrying the initial strength SUL_Ref_Power of the uplink reference signal of the UE to the SUL base station. After receiving the power control request, the SUL measures the corresponding uplink signal strength SUL_Receive_Power. The SUL base station calculates to obtain that the path loss of the SUL band of the UE is SUL PL=SUL_Ref_Power−SUL_Receive_Power, and sends the SUL PL to the NR normal base station.

In Step S402, the NR normal base station adjusts an initial open loop target receiving power of the UE according to the measured path loss of the SUL band and a path loss of the SUL band corresponding to an initial transmission power of the UE to obtain an open loop target receiving power of the UE.

In the embodiment, the NR normal base station adjusts the open loop target receiving power of the UE according to the SUL PL. The open loop target receiving power is a target power value for a specific UE. The adjustment manner is that the NR normal base station compares the SUL PL measured by the SUL base station with the SUL PL0 corresponding to the initial transmission power of the UE, and adds the value of SUL PL0−SUL PL to an initial open loop target receiving power $P_{O\_UE\_PUSCH,b,f,c}(j)$ of the UE to obtain the open loop target receiving power of the UE as the power control information. SUL PL0 may be actively reported by the UE or calculated by the SUL base station or the NR normal base station.

Solution 5: The UE sends the power control request to the NR normal base station. The NR normal base station obtains the open loop target receiving power of the UE as the power control information according to the power control request.

Figure 8:
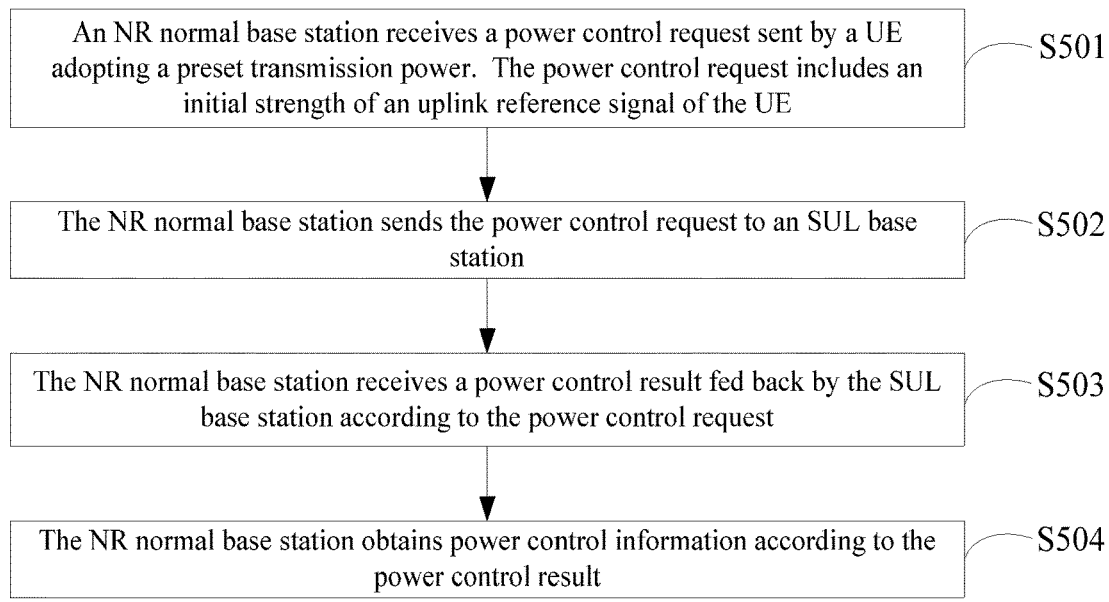
FIG. 8 is a flowchart of another power control method according to an embodiment of the disclosure.

As shown in FIG. 8, the step where "the NR normal base station obtains the power control information" includes the following.

In Step S501, an NR normal base station receives a power control request sent by a UE adopting a preset transmission power. The power control request includes an initial strength of an uplink reference signal of the UE.

In Step S502, the NR normal base station sends the power control request to an SUL base station.

In Step S503, the NR normal base station receives a power control result fed back by the SUL base station according to the power control request.

The power control result may include the path loss of the SUL band or may also include the uplink receiving signal strength of the SUL band.

In Step S504, the NR normal base station obtains power control information according to the power control result.

Due to different information in the power control result, the NR normal base station obtains the power control information according to the power control result in different manners. The following describes the specific implementation of "the NR normal base stations obtaining the power control information according to the power control result" in various manners.

Manner 1: The power control result includes the measured path loss of the SUL band. The measured path loss of the SUL band is obtained by the SUL base station according to the initial strength of the uplink reference signal and the uplink receiving signal strength of the SUL band.

In the embodiment, the NR normal base station obtaining the power control information according to the power control result includes: the NR normal base station adjusting the initial open loop target receiving power of the UE according to the measured path loss of the SUL band and the path loss of the SUL band corresponding to the initial transmission power of the UE to obtain the open loop target receiving power of the UE as the power control information.

In the embodiment, a terminal adopts the preset transmission power to send the power control request for requesting the SUL band path auxiliary power control to the NR normal base station, and writes the initial strength SUL_Ref_Power of the uplink reference signal of the SUL band in the power control request. The NR normal base station informs the SUL base station of the request message of the UE. After receiving the request message, the SUL base station starts measurement to obtain the corresponding uplink signal strength SUL_Receive_Power. The SUL base station calculates to obtain the measured path loss SUL PL of the SUL band according to the equation SUL PL=SUL_Ref_Power−SUL_Receive_Power, and sends the measured path loss SUL PL of the SUL band to the NR normal base station. The NR normal base station adjusts the open loop target receiving power of the UE according to the SUL PL. The adjustment manner is that the NR normal base station compares the SUL PL measured by the SUL base station with the SUL PL0 corresponding to the initial transmission power of the UE, and adds the value of SUL PL0−SUL PL to $P_{O\_UE\_PUSCH,b,f,c}(j)$ to obtain the open loop target receiving power of the UE.

Manner 2: The power control result includes the uplink receiving signal strength of the SUL band.

In the embodiment, the NR normal base station obtaining the power control information according to the power control result includes: the NR normal base station determining the measured path loss of the SUL band according to the initial strength of the uplink reference signal and the uplink receiving signal strength of the SUL band, and the NR normal base station adjusting the initial open loop target receiving power of the UE according to the measured path loss of the SUL band and the path loss of the SUL band corresponding to the initial transmission power of the UE to obtain the open loop target receiving power of the UE as the power control information.

The difference of the solution of the embodiment from Manner 1 is that the SUL base station sends the measured uplink signal strength SUL_Receive_Power to the NR normal base station, the NR normal base station calculates to obtain the measured path loss SUL PL of the SUL band according to the equation SUL PL=SUL_Ref_Power−SUL_Receive_Power, and the NR normal base station adjusts the open loop target receiving power of the UE according to the SUL PL. Other steps are the same as Manner 1 and will not be repeated here.

In both Manner 1 and Manner 2 above, the open loop target receiving power of the UE is used as the power control information, that is, the UE adjusts the transmission power according to the open loop target receiving power. The following Manner 3 and Manner 4 respectively introduce the specific method of using the path loss of the SUL band as the power control information, that is, when the UE adjusts the transmission power according to the path loss of the SUL band, the NR normal base station obtains the power control information according to the power control result.

Manner 3: The power control result includes the path loss of the SUL band. The path loss of the SUL band is obtained by the SUL base station according to the initial strength of the uplink reference signal and the uplink receiving signal strength of the SUL band. The NR normal base station obtaining the power control information according to the power control result includes: the NR normal base station determining the path loss of the SUL band as the power control information.

In the embodiment, the UE adopts the preset transmission power to send the power control request for requesting the SUL band path auxiliary power control to the NR normal base station. The power control request carries the initial strength SUL_Ref_Power of the uplink reference signal of the SUL band. The NR normal base station informs the SUL base station of the power control request of the UE. After receiving the power control request, the SUL base station starts measurement to obtain the corresponding uplink signal strength SUL_Receive_Power. The SUL base station calculates the path loss SUL PL of the SUL band according to the equation SUL PL=SUL_Ref_Power−SUL_Receive_Power, and sends the SUL PL to the NR normal base station. The NR normal base station then forwards the SUL PL to the UE. The UE adjusts the transmission power according to the SUL PL.

Manner 4: The power control result includes the uplink receiving signal strength of the SUL band. The NR normal base station obtaining the power control information according to the power control result includes: the NR normal base station obtaining the path loss of the SUL band as the power control information according to the initial strength of the uplink reference signal and the uplink receiving signal strength of the SUL band.

In the embodiment, the difference from Manner 3 is that the SUL base station sends the measured uplink signal strength SUL_Receive_Power to the NR normal base station. The NR normal base station calculates the path loss SUL PL of the SUL band according to the equation SUL PL=SUL_Ref_Power−SUL_Receive_Power, and then forwards the SUL PL to the UE. The UE adjusts the transmission power according to the SUL PL.

In the power control method according to Embodiment 2 above, when the NR normal band and the SUL band are deployed in different station sites, and there is no LTE band deployed in a co-station site with the SUL band and the spectrums overlap or are close, various methods may be adopted to determine the power control information, which may be flexibly applied in various scenarios.

Solution 3 to Solution 5 above all use the NR normal base station as the execution subject. The power control method is introduced below using the SUL base station as the execution subject.

Solution 6: When the SUL band and the NR normal band are deployed in different station sites, and there is no LTE band that overlaps or is close to the spectrum of the SUL band, how does the SUL implement the power control?

In the embodiment, the power control method includes: the SUL base station receiving the power control request carrying the initial strength of the uplink reference signal of the UE. The power control request is a request triggered when the UE receives the SUL carrier information sent by the NR normal base station. The SUL carrier information is used to indicate that the SUL band and the NR normal band are deployed in different station sites, and there is no target band deployed in a co-station with the SUL band. The standards of the target band and the SUL band are different, and the spectrum interval between the target band and the SUL band is less than or equal to the preset threshold value. The SUL carrier information is also used to instruct the UE to obtain the power control information. The power control information is used to adjust the uplink transmission power of the UE.

In one of the embodiments, there being no target band deployed in a co-station with the SUL band includes: the SUL band and the target band being deployed in different station sites or there being no target band.

In one of the embodiments, the power control information includes the path loss of the SUL band. The path loss of the SUL band is obtained by the SUL base station or the NR normal base station according to the initial strength of the uplink reference signal and the uplink receiving signal strength of the SUL band.

In one of the embodiments, the power control information includes the open loop target receiving power of the UE. The open loop target receiving power is obtained by the NR normal base station adjusting the initial open loop target receiving power of the UE according to the measured path loss of the SUL band and the path loss of the SUL band corresponding to the initial transmission power of the UE. The measured path loss of the SUL band is obtained by the SUL base station or the NR normal base station according to the initial strength of the uplink reference signal and the uplink receiving signal strength of the SUL band.

In one of the embodiments, the SUL base station receiving the power control request carrying the initial strength of the uplink reference signal of the UE includes: the SUL base station receiving the power control request sent by the UE adopting the maximum transmission power.

In one of the embodiments, the SUL base station receiving the power control request carrying the initial strength of the uplink reference signal of the UE includes: the SUL base station receiving the power control request sent by the NR normal base station.

In one of the embodiments, the method further includes: the SUL base station measuring the uplink signal strength of the UE; and the SUL base station calculating the path loss of the SUL band according to the uplink signal strength of the UE and the initial strength of the uplink reference signal of the UE.

The SUL base station sends the path loss of the SUL band to the NR normal base station.

In one of the embodiments, the method further includes: the SUL base station measuring the uplink signal strength of the UE; the SUL base station sending the uplink signal strength of the UE to the NR normal base station; and the NR normal base station calculating the path loss of the SUL band according to the uplink signal strength of the UE and the initial strength of the uplink reference signal of the UE.

For the specific implementation principle and beneficial effect of Solution 6 above, reference may be made to Solution 1 to Solution 5 above, which will not be repeated here.

It should be understood that although the steps in the flowcharts of FIG. 4 to FIG. 8 are sequentially displayed as indicated by the arrows, the steps are not necessarily sequentially executed in the sequence indicated by the arrows. Unless explicitly described in the disclosure, there is no strict limitation on the execution sequence of the steps, and the steps may be executed in other sequences. Moreover, at least part of the steps in FIG. 4 to FIG. 8 may include multiple sub-steps or multiple stages. The sub-steps or stages are not necessarily executed at the same time and may be executed at different times. The execution sequence of the sub-steps or stages is not necessarily performed sequentially, and the sub-steps or stages may be executed in turn or alternately executed with at least part of other steps or sub-steps or stages of other steps.

Figure 9:
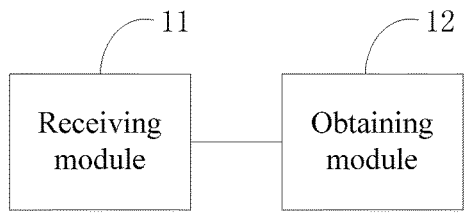
FIG. 9 is a block diagram of a power control apparatus according to an embodiment of the disclosure.

In an embodiment, as shown in FIG. 9, a power control apparatus is provided, which includes the following.

A receiving module 11 is used to receive single uplink (SUL) carrier information sent by a new radio (NR) normal base station. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value.

An obtaining module 12 is used to obtain power control information according to the SUL carrier information. The power control information is used to adjust an uplink transmission power of a UE.

The implementation principle and technical effect of the power control apparatus according to the embodiment are similar to the above embodiment of the method and will not be repeated here.

In an embodiment, the SUL carrier information is used to indicate that there is the target band deployed in a co-station with the SUL band. The power control information includes a path loss of the target band obtained by the UE according to a downlink signal strength of the target band.

In an embodiment, the SUL carrier information is used to indicate that there is no target band deployed in a co-station with the SUL band. The obtaining module includes: a sending unit for sending a power control request, wherein the power control request includes an initial strength of an uplink reference signal of the UE, and the base station is the SUL base station or the NR normal base station; and a receiving unit for receiving the power control information sent by the NR normal base station, wherein the power control information is determined based on the initial strength of the uplink reference signal.

In an embodiment, there being no target band deployed in a co-station with the SUL band includes: the SUL band and the target band being deployed in different station sites or there being no target band.

In an embodiment, the sending unit is used to send the power control request to the SUL base station by adopting a maximum transmission power.

In an embodiment, the sending unit is used to send the power control request to the NR normal base station by adopting a preset transmission power.

In an embodiment, the power control information includes the path loss of the SUL band. The path loss of the SUL band is obtained by the SUL base station or the NR normal base station according to the initial strength of the uplink reference signal and an uplink receiving signal strength of the SUL band.

In an embodiment, the power control information includes an open loop target receiving power of the UE. The open loop target receiving power is obtained by the NR normal base station adjusting an initial open loop target receiving power of the UE according to a measured path loss of the SUL band and the path loss of the SUL band corresponding to an initial transmission power of the UE. The measured path loss of the SUL band is obtained by the SUL base station or the NR normal base station according to the initial strength of the uplink reference signal and the uplink receiving signal strength of the SUL band.

Figure 10:
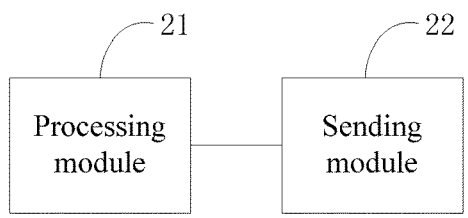
FIG. 10 is a block diagram of another power control apparatus according to an embodiment of the disclosure.

In an embodiment, as shown in FIG. 10, a power control apparatus is provided, which includes: a processing module 21 and a sending module 22.

The processing module 21 is used to send SUL carrier information through the sending module 22. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value. The SUL carrier information is also used to instruct a UE to obtain power control information. The power control information is used to adjust an uplink transmission power of the UE.

In an embodiment, the SUL carrier information is used to indicate that there is the target band deployed in a co-station with the SUL band. The power control information includes a path loss of the target band obtained by the UE according to a downlink signal strength of the target band.

In an embodiment, the SUL carrier information is used to indicate that there is no target band deployed in a co-station with the SUL band. The apparatus further includes: an obtaining module for obtaining the power control information and sending the power control information to the UE through the sending module.

In an embodiment, there being no target band deployed in a co-station with the SUL band includes: the SUL band and the target band being deployed in different station sites or there being no target band.

In an embodiment, the power control information includes the path loss of the SUL band. The path loss of the SUL band is obtained by the SUL base station or the NR normal base station according to an initial strength of an uplink reference signal and an uplink receiving signal strength of the SUL band.

In an embodiment, the power control information includes an open loop target receiving power of the UE. The open loop target receiving power is obtained by the NR normal base station adjusting an initial open loop target receiving power of the UE according to a measured path loss of the SUL band and the path loss of the SUL band corresponding to an initial transmission power of the UE. The measured path loss of the SUL band is obtained by the SUL base station or the NR normal base station according to the initial strength of the uplink reference signal and the uplink receiving signal strength of the SUL band.

In an embodiment, the obtaining module is used to receive the power control information sent by the SUL base station. The power control information includes the path loss of the SUL band. The path loss of the SUL band is obtained by the SUL base station according to the initial strength of the uplink reference signal of the UE and the uplink receiving signal strength of the SUL band.

In an embodiment, the power control information includes the open loop target receiving power of the UE. The obtaining module is used to receive the measured path loss of the SUL band sent by the SUL base station. The measured path loss of the SUL band is obtained by the SUL base station according to the initial strength of the uplink reference signal of the UE and the uplink receiving signal strength of the SUL band. The initial open loop target receiving power of the UE is adjusted according to the measured path loss of the SUL band and the path loss of the SUL band corresponding to the initial transmission power of the UE to obtain the open loop target receiving power of the UE.

In an embodiment, the obtaining module is used to receive the power control request sent by the UE adopting the preset transmission power, wherein the power control request includes the initial strength of the uplink reference signal of the UE; send the power control request to the SUL base station; receive a power control result fed back by the SUL base station according to the power control request; and obtain the power control information according to the power control result.

In an embodiment, the power control result includes the measured path loss of the SUL band. The measured path loss of the SUL band is obtained by the SUL base station according to the initial strength of the uplink reference signal and the uplink receiving signal of the SUL band. The obtaining module is used to adjust the initial open loop target receiving power of the UE according to the measured path loss of the SUL band and the path loss of the SUL band corresponding to the initial transmission power of the UE to obtain the open loop target receiving power of the UE as the power control information.

In an embodiment, the power control result includes the uplink receiving signal strength of the SUL band. The obtaining module is used to determine the measured path loss of the SUL band according to the initial strength of the uplink reference signal and the uplink receiving signal strength of the SUL band; and adjust the initial open loop target receiving power of the UE according to the measured path loss of the SUL band and the path loss of the SUL band corresponding to the initial transmission power of the UE to obtain the open loop target receiving power of the UE as the power control information.

In an embodiment, the power control result includes the path loss of the SUL band. The path loss of the SUL band is obtained by the SUL base station according to the initial strength of the uplink reference signal and the uplink receiving signal strength of the SUL band. The obtaining module is used to determine the path loss of the SUL band as the power control information.

In an embodiment, the power control result includes the uplink receiving signal strength of the SUL band. The obtaining module is used to obtain the path loss of the SUL band as the power control information according to the initial strength of the uplink reference signal and the uplink receiving signal strength of the SUL band.

Figure 11:
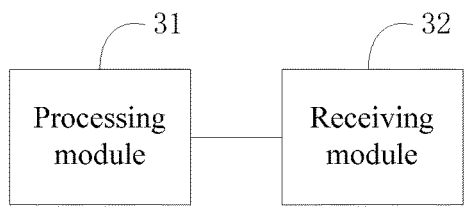
FIG. 11 is a block diagram of another power control apparatus according to an embodiment of the disclosure.

In an embodiment, as shown in FIG. 11, a power control apparatus is provided, which includes: a processing module 31 and a receiving module 32.

The processing module 31 is used to receive a power control request carrying an initial strength of an uplink reference signal of a UE through the receiving module 32. The power control request is a request triggered when the UE receives SUL carrier information sent by an NR normal base station. The SUL carrier information is used to indicate that an SUL band and an NR normal band are deployed in different station sites and there is no target band deployed in a co-station with the SUL band. Standards of the target band and the SUL band are different, and a spectrum interval between the target band and the SUL band is less than or equal to a preset threshold value. The SUL carrier information is also used to instruct the UE to obtain power control information. The power control information is used to adjust an uplink transmission power of the UE.

In an embodiment, there being no target band deployed in a co-station with the SUL band includes: the SUL band and the target band being deployed in different station sites or there being no target band.

In an embodiment, the power control information includes a path loss of the SUL band. The path loss of the SUL band is obtained by the SUL base station or the NR normal base station according to an initial strength of an uplink reference signal and an uplink receiving signal strength of the SUL band.

In an embodiment, the power control information includes an open loop target receiving power of the UE. The open loop target receiving power is obtained by the NR normal base station adjusting an initial open loop target receiving power of the UE according to a measured path loss of the SUL band and the path loss of the SUL band corresponding to an initial transmission power of the UE. The measured path loss of the SUL band is obtained by the SUL base station or the NR normal base station according to the initial strength of the uplink reference signal and the uplink receiving signal strength of the SUL band.

In an embodiment, the receiving module is used to receive the power control request sent by the UE adopting a maximum transmission power.

In an embodiment, the receiving module is used to receive the power control request sent by the NR normal base station.

In an embodiment, the apparatus further includes: a measuring module, used to measure an uplink signal strength of the UE and calculate the path loss of the SUL band according to the uplink signal strength of the UE and the initial strength of the uplink reference signal of the UE; and a sending module, used to send the path loss of the SUL band to the NR normal base station.

In an embodiment, the apparatus further includes: a measuring module, used to measure the uplink signal strength of the UE; and a sending module, used to send the uplink signal strength of the UE to the NR normal base station. The NR normal base station is used to calculate the path loss of the SUL band according to the uplink signal strength of the UE and the initial strength of the uplink reference signal of the UE.

The implementation principle and technical effect of the power control apparatus according to the embodiment are similar to the above embodiment of the method and will not be repeated here.

For the specific limitation of the power control apparatus, reference may be made to the above limitation of the power control method, which will not be repeated here. Each module in the power control apparatus may be implemented in whole or in part by software, hardware, and a combination thereof. Each module may be embedded in or independent of a processor in a computer device in the form of hardware or may be stored in a memory in the computer device in the form of software, so that the processor may call and execute the operation corresponding to each module.

Figure 12:
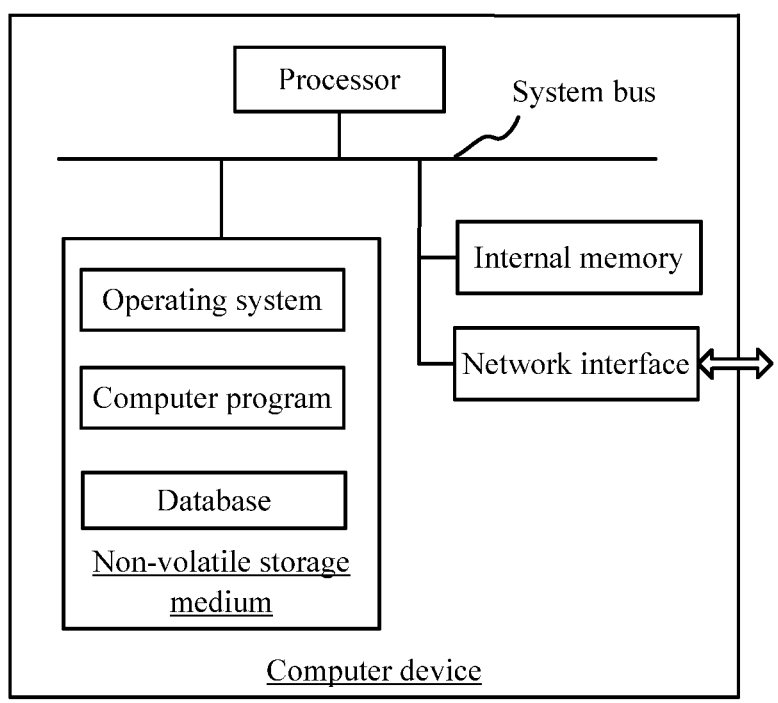
FIG. 12 is a block diagram of a computer device according to an embodiment of the disclosure.

In an embodiment, a computer device is provided. The computer device may be a UE, an NR normal base station, or an SUL base station, and an internal structure diagram thereof may be as shown in FIG. 12. The computer device includes a processor, a memory, a network interface, and a database connected through a system bus. The processor of the computer device is used to provide calculation and control capabilities. The memory of the computer device includes a non-volatile storage medium and an internal memory. The non-volatile storage medium stores an operating system, a computer program, and a database. The internal memory provides an environment for the running of the operating system and the computer program in the non-volatile storage medium. The database of the computer device is used to store power control data. The network interface of the computer device is used to communicate with an external terminal through a network connection. When the computer program is executed by the processor, a power control method is implemented.

Persons skilled in the art should understand that the structure shown in FIG. 12 is only a block diagram of part of the structure related to the solution of the disclosure and does not constitute a limitation on the computer device to which the solution of the disclosure is applied. The computer device may specifically include more or less parts than shown in the drawing, combining certain parts, or having different arrangement of parts.

In an embodiment, a computer device is provided, which includes a memory and a processor. The memory stores a computer program. When the processor executes the computer program, the following steps are implemented.

Single uplink SUL carrier information sent by a new radio (NR) normal base station is received. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value.

Power control information is obtained according to the SUL carrier information. The power control information is used to adjust an uplink transmission power of a UE.

In an embodiment, a computer device is provided, which includes a memory and a processor. The memory stores a computer program. When the processor executes the computer program, the following steps are implemented.

SUL carrier information is sent. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value. The SUL carrier information is also used to instruct a UE to obtain power control information. The power control information is used to adjust an uplink transmission power of the UE.

In an embodiment, a computer device is provided, which includes a memory and a processor. The memory stores a computer program. When the processor executes the computer program, the following steps are implemented.

A power control request carrying an initial strength of an uplink reference signal of a UE is received. The power control request is a request triggered when the UE receives SUL carrier information sent by an NR normal base station. The SUL carrier information is used to indicate that an SUL band and an NR normal band are deployed in different station sites and there is no target band deployed in a co-station with the SUL band. Standards of the target band and the SUL band are different, and a spectrum interval between the target band and the SUL band is less than or equal to a preset threshold value. The SUL carrier information is also used to instruct the UE to obtain power control information. The power control information is used to adjust an uplink transmission power of the UE.

The implementation principle and technical effect of the computer device according to the embodiment are similar to the above embodiment of the method and will not be repeated here.

In an embodiment, a computer-readable storage medium, storing a computer program, is provided. When the computer program is executed by a processor, the following steps are implemented.

Single uplink SUL carrier information sent by a new radio (NR) normal base station is received. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value.

Power control information is obtained according to the SUL carrier information. The power control information is used to adjust an uplink transmission power of a UE.

In an embodiment, a computer-readable storage medium, storing a computer program, is provided. When the computer program is executed by a processor, the following steps are implemented.

SUL carrier information is sent. The SUL carrier information is used to indicate that an SUL band and an NR normal band are deployed in different station sites and whether there is a target band deployed in a co-station with the SUL band. Standards of the target band and the SUL band are different, and a spectrum interval between the target band and the SUL band is less than or equal to a preset threshold value. The SUL carrier information is also used to instruct a UE to obtain power control information. The power control information is used to adjust an uplink transmission power of the UE.

In an embodiment, a computer-readable storage medium, storing a computer program, is provided. When the computer program is executed by a processor, the following steps are implemented.

A power control request carrying an initial strength of an uplink reference signal of a UE is received. The power control request is a request triggered when the UE receives SUL carrier information sent by an NR normal base station. The SUL carrier information is used to indicate that an SUL band and an NR normal band are deployed in different station sites and there is no target band deployed in a co-station with the SUL band. Standards of the target band and the SUL band are different, and a spectrum interval between the target band and the SUL band is less than or equal to a preset threshold value. The SUL carrier information is also used to instruct the UE to obtain power control information. The power control information is used to adjust an uplink transmission power of the UE.

The implementation principle and technical effect of the computer-readable storage medium according to the embodiment are similar to the above embodiment of the method and will not be repeated here.

Persons skilled in the art should understand that all or part of the processes in the above embodiment of the method may be completed by instructing related hardware through the computer program. The computer program may be stored in a non-volatile computer-readable storage medium. When the computer program is executed, the processes of the above embodiment of the method may be included. Any reference to a memory, a storage, a database, or other media used in the embodiment of the disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration and not a limitation, the RAM is available in many forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a rambus direct RAM (RDRAM), a direct rambus dynamic RAM (DRDRAM), a rambus dynamic RAM (RDRAM), etc.

The technical features of the above embodiments may be combined arbitrarily. In order for the description to be concise, not all possible combinations of the technical features in the above embodiments are described. However, as long as there is no conflict in the combination of the technical features, the combination should be considered as within the range described in the specification. The embodiments only express several implementations of the disclosure, and the descriptions are relatively specific and detailed, but the descriptions should not be understood as limitation on the scope of disclosure. It should be pointed out that for persons skilled in the art, several modifications and improvements may be made without departing from the concept of the disclosure, and the modifications and improvements all fall within the protection scope of the disclosure. Therefore, the protection scope of the disclosure shall be defined by the appended claims.

What is claimed is:

1. A power control method, characterized by comprising:
   receiving, by a user equipment (UE), single uplink (SUL) carrier information sent by a new radio (NR) normal base station, wherein the SUL carrier information is used to indicate that an SUL band and an NR normal band are deployed in different station sites and whether there is a target band deployed in a co-station with the SUL band, standards of the target band and the SUL band are different, and a spectrum interval between the target band and the SUL band is less than or equal to a preset threshold value;
   obtaining, by the UE, power control information according to the SUL carrier information, wherein the power control information is used to adjust an uplink transmission power of the UE.

2. The method according to claim 1, characterized in that the SUL carrier information is used to indicate that there is a target band deployed in a co-station with the SUL band, and the power control information comprises a path loss of the target band obtained by the UE according to a downlink signal strength of the target band.

3. The method according to claim 1, characterized in that the SUL carrier information is used to indicate that there is no target band deployed in a co-station with the SUL band, and obtaining, by the UE, the power control information according to the SUL carrier information comprises:
   sending, by the UE, a power control request to a base station, wherein the power control request comprises an initial strength of an uplink reference signal of the UE, and the base station is an SUL base station or an NR normal base station;
   receiving, by the UE, the power control information sent by the NR normal base station, wherein the power control information is determined based on the initial strength of the uplink reference signal;
   wherein there being no target band deployed in a co-station with the SUL band comprises: the SUL band and the target band being deployed in different station sites or there being no target band.

4. The method according to claim 3, characterized in that sending, by the UE, the power control request to the base station comprises:
   sending, by the UE adopting a maximum transmission power, the power control request to the SUL base station.

5. The method according to claim 3, characterized in that sending, by the UE, the power control request to the base station comprises:
   sending, by the UE adopting a preset transmission power, the power control request to the NR normal base station.

6. The method according to claim 3, characterized in that the power control information comprises a path loss of the SUL band;
   the path loss of the SUL band is obtained by the SUL base station or the NR normal base station according to the initial strength of the uplink reference signal and an uplink receiving signal strength of the SUL band.

7. The method according to claim 3, characterized in that the power control information comprises an open loop target receiving power of the UE;
the open loop target receiving power is obtained by the NR normal base station adjusting an initial open loop target receiving power of the UE according to a measured path loss of the SUL band and a path loss of the SUL band corresponding to an initial transmission power of the UE, wherein
the measured path loss of the SUL band is obtained by the SUL base station or the NR normal base station according to the initial strength of the uplink reference signal and an uplink receiving signal strength of the SUL band.

8. A power control method, characterized by comprising:
sending, by a new radio (NR) normal base station, single uplink (SUL) carrier information, wherein the SUL carrier information is used to indicate that an SUL band and an NR normal band are deployed in different station sites and whether there is a target band deployed in a co-station with the SUL band, standards of the target band and the SUL band are different, a spectrum interval between the target band and the SUL band is less than or equal to a preset threshold value, the SUL carrier information is also used to instruct a UE to obtain power control information, and the power control information is used to adjust an uplink transmission power of the UE.

9. The method according to claim 8, characterized in that the SUL carrier information is used to indicate that there is a target band deployed in a co-station with the SUL band, and the power control information comprises a path loss of the target band obtained by the UE according to a downlink signal strength of the target band.

10. The method according to claim 8, characterized in that the SUL carrier information is used to indicate that there is no target band deployed in a co-station with the SUL band, the method further comprising:
obtaining, by the NR normal base station, the power control information, and sending the power control information to the UE;
wherein there being no target band deployed in a co-station with the SUL band comprises: the SUL band and the target band being deployed in different station sites or there being no target band.

11. The method according to claim 10, characterized in that the power control information comprises a path loss of the SUL band;
the path loss of the SUL band is obtained by a SUL base station or the NR normal base station according to an initial strength of an uplink reference signal and an uplink receiving signal strength of the SUL band.

12. The method according to claim 10, characterized in that the power control information comprises an open loop target receiving power of the UE;
the open loop target receiving power is obtained by the NR normal base station adjusting an initial open loop target receiving power of the UE according to a measured path loss of the SUL band and a path loss of the SUL band corresponding to an initial transmission power of the UE, wherein
the measured path loss of the SUL band is obtained by a SUL base station or the NR normal base station according to an initial strength of an uplink reference signal and an uplink receiving signal strength of the SUL band.

13. The method according to claim 10, characterized in that obtaining, by the NR normal base station, the power control information comprises:
receiving, by the NR normal base station, the power control information sent by the SUL base station, wherein the power control information comprises a path loss of the SUL band, and the path loss of the SUL band is obtained by the SUL base station according to an initial strength of an uplink reference signal of the UE and an uplink receiving signal strength of the SUL band.

14. The method according to claim 10, characterized in that the power control information comprises an open loop target receiving power of the UE, and obtaining, by the NR normal base station, the power control information comprises:
receiving, by the NR normal base station, a measured path loss of the SUL band sent by the SUL base station, wherein the measured path loss of the SUL band is obtained by the SUL base station according to an initial strength of an uplink reference signal of the UE and an uplink receiving signal strength of the SUL band;
adjusting, by the NR normal base station, an initial open loop target receiving power of the UE according to the measured path loss of the SUL band and a path loss of the SUL band corresponding to an initial transmission power of the UE to obtain the open loop target receiving power of the UE.

15. The method according to claim 10, characterized in that obtaining, by the NR normal base station, the power control information comprises:
receiving, by the NR normal base station, a power control request sent by the UE adopting a preset transmission power, wherein the power control request comprises an initial strength of an uplink reference signal of the UE;
sending, by the NR normal base station, the power control request to a SUL base station;
receiving, by the NR normal base station, a power control result fed back by the SUL base station according to the power control request;
obtaining, by the NR normal base station, the power control information according to the power control result.

16. The method according to claim 15, characterized in that the power control result comprises a measured path loss of the SUL band, and the measured path loss of the SUL band is determined by the SUL base station according to the initial strength of the uplink reference signal and an uplink receiving signal strength of the SUL band;
obtaining, by the NR normal base station, the power control information according to the power control result comprises:
adjusting, by the NR normal base station, an initial open loop target receiving power of the UE according to the measured path loss of the SUL band and a path loss of the SUL band corresponding to an initial transmission power of the UE to obtain an open loop target receiving power of the UE as the power control information.

17. The method according to claim 15, characterized in that the power control result comprises an uplink receiving signal strength of the SUL band;
obtaining, by the NR normal base station, the power control information according to the power control result comprises:

determining, by the NR normal base station, a measured path loss of the SUL band according to an initial strength of an uplink reference signal and an uplink receiving signal strength of the SUL band;

adjusting, by the NR normal base station, an initial open loop target receiving power of the UE according to the measured path loss of the SUL band and a path loss of the SUL band corresponding to an initial transmission power of the UE to obtain an open loop target receiving power of the UE as the power control information.

18. The method according to claim 15, characterized in that the power control result comprises a path loss of the SUL band; the path loss of the SUL band is obtained by the SUL base station according to the initial strength of the uplink reference signal and an uplink receiving signal strength of the SUL band;

obtaining, by the NR normal base station, the power control information according to the power control result comprises:

determining, by the NR normal base station, the path loss of the SUL band as the power control information.

19. The method according to claim 15, characterized in that the power control result comprises an uplink receiving signal strength of the SUL band;

obtaining, by the NR normal base station, the power control information according to the power control result comprises:

obtaining, by the NR normal base station, a path loss of the SUL band as the power control information according to the initial strength of the uplink reference signal and the uplink receiving signal strength of the SUL band.

20. A power control method, characterized by comprising:

receiving, by a single uplink (SUL) base station, a power control request carrying an initial strength of an uplink reference signal of a user equipment (UE), wherein the power control request is a request triggered when the UE receives SUL carrier information sent by an NR normal base station, the SUL carrier information is used to indicate that an SUL band and an NR normal band are deployed in different station sites and there is no target band deployed in a co-station with the SUL band, standards of the target band and the SUL band are different, a spectrum interval between the target band and the SUL band is less than or equal to a preset threshold value, the SUL carrier information is also used to instruct the UE to obtain power control information, and the power control information is used to adjust an uplink transmission power of the UE.

* * * * *